United States Patent
Takagi

[19]

[11] Patent Number: 6,012,849
[45] Date of Patent: Jan. 11, 2000

[54] BEARING STRUCTURE OF ROTATING MACHINE

[75] Inventor: Atsushi Takagi, Toyohashi, Japan

[73] Assignee: ASMO Co., Ltd., Shizouka-ken, Japan

[21] Appl. No.: 09/092,318

[22] Filed: Jun. 5, 1998

[30] Foreign Application Priority Data

Jun. 6, 1997 [JP] Japan .................................. 9-149516

[51] Int. Cl.[7] ............................................... F16C 23/04
[52] U.S. Cl. ........................... 384/204; 384/192; 384/213
[58] Field of Search ................................. 384/192, 203, 384/204, 206, 211, 212, 213, 214; 310/90

[56] References Cited

U.S. PATENT DOCUMENTS

| 4,409,505 | 10/1983 | Petersen | ..................... 310/90 |
| 5,107,158 | 4/1992 | Peck | ..................... 384/192 X |
| 5,192,137 | 3/1993 | Renard | ..................... 384/192 X |
| 5,677,584 | 10/1997 | Keck | ..................... 384/204 X |

FOREIGN PATENT DOCUMENTS

| 63-167358 U | 10/1988 | Japan . | |
| 5-69435 U | 9/1993 | Japan . | |
| 5-87325 U | 11/1993 | Japan . | |
| 6-70503 | 3/1994 | Japan . | |
| 7-67282 | 3/1998 | Japan . | |
| 2210736 | 9/1988 | United Kingdom | .................. 384/192 |

Primary Examiner—Thomas R. Hannon
Attorney, Agent, or Firm—Fish & Richardson P.C.

[57] ABSTRACT

A rotating shaft of a rotating machine is supported at its both ends by bearing bushes which are held in a frame of the rotating machine. The outer periphery of the bearing bush is rounded and held with a rounded surface formed on the frame, so that the rotational axis of the shaft and the bearing are self-aligned by rotation of the bearing bush. The inner bore of the bearing bush rotatably supporting the shaft therein is shortened by forming a relief bore, the diameter of which is larger than that of the inner bore. Because of this bearing structure, a natural vibration frequency of the shaft varies less, and, therefore, the rotating machine can be easily designed so that harmful noises due to the natural vibration are sufficiently suppressed.

6 Claims, 3 Drawing Sheets

BEARING STRUCTURE OF ROTATING MACHINE

CROSS-REFERENCE TO RELATED APPLICATION

This application is based upon and claims benefit of priority of Japanese Patent Application No. Hei-9-149516 filed on Jun. 6, 1997, the content of which is incorporated herein by reference.

BACKGROUND OF THE INVENTION

1. Field of the Invention

The present invention relates to a bearing structure used in a rotating machine such as a motor and to a rotating machine having the bearing structure.

2. Description of Related Art

A motor shown in FIG. 5 has been used as a fan motor for an airconditioner unit in an automobile. A motor 51 is composed of a housing 52, an rear end frame 53 closing an open end of the housing 52 and a rotor 54 having a shaft 55 rotatably supported in the housing 52 and the rear end frame 53. The rotor shaft 55 is rotatably supported by both bearing bushes 56, each having a bearing hole 56a. One of the bearing bushes 56 located in the front end is supported in a cup portion of the housing 52 and held therein by a bearing retainer 57. The other bearing bush 56 located in the rear end is supported in a cup portion of the rear end frame 53 and held therein by another retainer 57. Outer peripheral end corners of the bearing bush 56 are rounded, and the cup portion and the retainer 57 holding the bearing bush also have a round surface to contact the rounded corners of the bearing bush. Therefore, the bearing bush 56 can rotate a little in the cup portion to automatically align with the axis of the rotor shaft 55 when the bearing bush receives external force such as vibration. This is known as "self-alignment." However, a position where the shaft actually contacts the bearing hole and is supported ("supporting position") differs depending on delicate condition of the self-alignment. Accordingly, a distance between supporting positions of both bearing bushes varies in a range of two times of the length of the bearing bush. A natural bending vibration frequency of the shaft 55 also varies according to the variation of the distance between supporting positions. If the natural vibration frequency of the shaft becomes close to a basic frequency of rotational speed of the motor, the shaft and the motor vibrate in resonance, and resonance noises will be generated.

Another example of this kind of motor is shown in JP-U-5-69435, in which a third bearing is disposed between both end bearings to suppress an abnormal vibration of a shaft caused by bending of the shaft. Also, a relief bore having a tapered surface is disposed at an outer end of a bearing hole of the end bearing, so that the shaft does not contact the bearing hole at a portion where the relief bore is formed. However, since no self-alignment structure is employed in the motor, vibration noises will be generated when a misalignment between the rotational axis and the bearing holes exists.

SUMMARY OF THE INVENTION

The present invention has been made in view of the above-mentioned problem, and an object of the present invention is to provide a bearing structure of a rotating machine in which vibration noises are suppressed with a simple structure. Another object of the present invention is to provide a motor having such a bearing structure.

A rotating shaft of a rotating machine is supported at its both ends by bearing bushes. The bearing bushes are held by a frame member of the rotating machine. The outer periphery of the bearing bush is rounded to allow its rotation relative to the frame member holding the bearing bush. The rotational axis of the shaft and the bearing bush are self-aligned by rotation of the bearing bush.

The bearing hole of the bearing bush is divided into two portions, a bearing surface on which the rotating shaft is supported and a relief bore having a diameter larger than that of the bearing surface. The relief bore is formed next to the bearing surface and its one end is open toward the outside of the rotating machine. The axial length of the bearing surface is shortened by the relief bore, and accordingly a fluctuation of a distance between both supporting positions on the bearing bushes becomes smaller. Because of this structure, a natural vibration frequency of the shaft varies in a smaller range. Therefore, the natural vibration frequency is easily avoided in designing the motor to reduce noises due to the vibration of the shaft.

Preferably, the relief bores of both bearings are disposed so that they are open toward the outside of the rotating machine. The relief bore may be formed in a cylindrical shape, or in a tapered bore so that its diameter is gradually enlarged toward the open end.

The bearing structure according to the present invention makes the self-alignment of the rotation axis easier, and effectively suppresses the vibration noises with a simple structure.

Other objects and features of the present invention will become more readily apparent from a better understanding of the preferred embodiment described below with reference to the following drawings.

DETAILED DESCRIPTION OF THE PREFERRED EMBODIMENT

Figure 1:
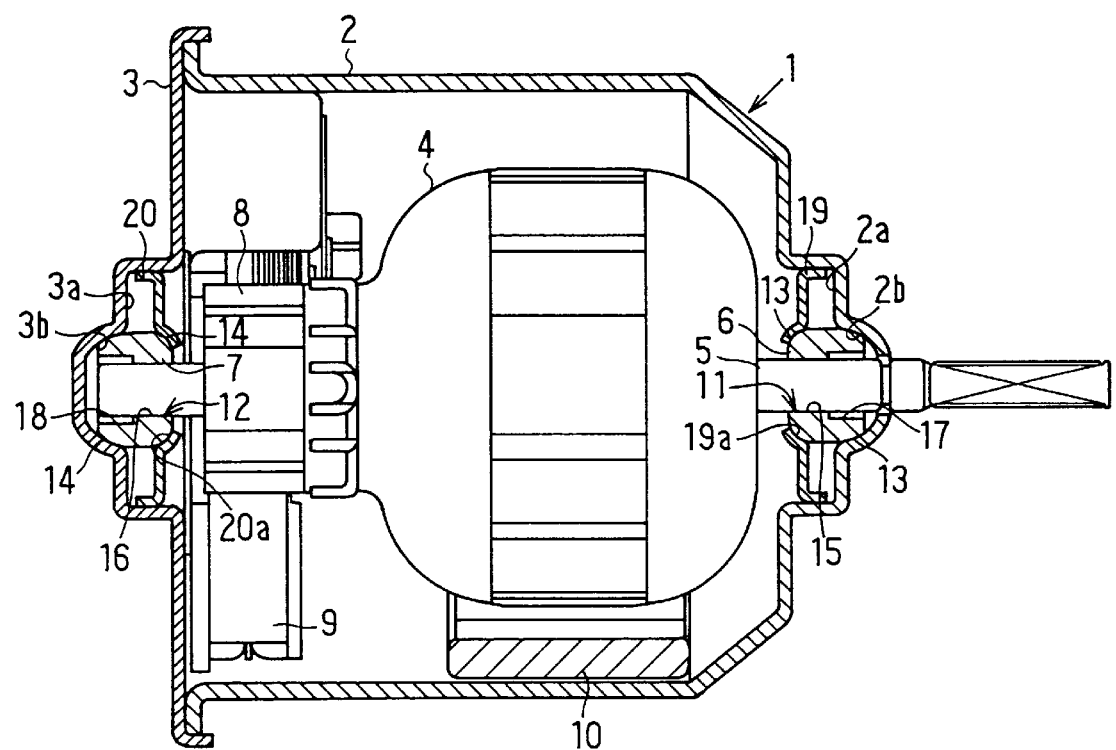
FIG. 1 is a cross-sectional view showing a motor as a preferred embodiment of the present invention.

Referring to FIG. 1, a preferred embodiment of the present invention will be described. As shown in FIG. 1, a motor 1 is composed of a cylindrical housing 2 with one end closed and the other end open, an rear end frame 3 closing the open end of the housing 2, and a rotor 4 rotatably supported in the housing 2 and the rear end frame 3 with front and rear bearing bushes 6, 7, each being held in respective cup portions 2a, 3a of the housing 2 and the rear end frame 3. The rotor 4 has a shaft 5 on which a commutator 8 is fixedly mounted. Brushes slidably contact the commutator 8. A plurality of permanent magnets 10 are disposed inside the housing 2 at equal intervals.

The front bearing bush 6 has a bearing hole 11 through which the shaft 5 is inserted and rounded corners 13 at its outer peripheral corners. The bearing hole 11 includes two portions, a bearing surface 15 and a relief bore 17. The diameter of the relief bore 17 is larger than the outer diameter of the shaft 5. Similarly, the rear bearing bush 7 has a bearing hole 12 and rounded corners 14. The bearing hole 12 includes two portions, a bearing surface 16 and a relief bore 18. Both bearing bushes 6, 7 are oil-impregnated bearings made of a porous material in which lubricant oil is retained. The front bearing bush 6 is held and supported in the cup portion 2a of the housing 2 by a bearing retainer 19. The cup portion 2a includes a round holding surface 2b which contacts the rounded corner 13 of the front bearing bush 6. The bearing retainer 19 also has a round holding surface 19a which contacts the other rounded corner 13 of the front bearing bush 6. Similarly, the rear bearing bush 7 is held and supported in the cup portion 3a of the rear end frame 3 by a bearing retainer 20. The cup portion 3a includes a round holding surface 3b which contacts the rounded corner 14 of the rear bearing bush 7. The bearing retainer 20 also has a round holding surface 20a which contacts the other rounded corner 14 of the rear bearing bush 7. Since both bearing bushes 6, 7 are held and supported in contact with the rounded corners, they are able to adjustably rotate in the respective cup portions 2a, 3a for "self-alignment."

Now, function of the bearing structure described above will be explained, referring to FIGS. 2, 3A and 3B. When the motor is driven, the motor shaft 5 rotates in the bearing holes 11, 12 of both bearing bushes 6, 7. If the shaft 5 is not sufficiently aligned with the bearing bushes 6, 7, vibrating force is applied to the bearing bushes 6, 7 from the shaft 5. The vibrating force is applied to both bearing bushes 6, 7 as couple force. That is, force B shown in FIG. 3A is applied to the front bearing bush 6, and force A shown in FIG. 3B is applied to the rear bearing bush 7. Since both bearing bushes 6, 7 are adjustably rotatable, both bearing bushes are self-aligned with the rotational axis of the shaft 5. The rotational torque applied to the bearing bush 6 is proportional to a distance between the holding surface 2b and the supporting position (the position at which the shaft 5 actually contacts the bearing bush 6 and is supported thereby). The supporting position exists on one point on the bearing surface 15. Therefore, the distance between the holding surface 2b and the supporting position becomes longer in the bearing structure in which the relief bore 17 is formed at the front end as in the present embodiment, compared with the distance in the bearing structure in which no relief bore is formed or the relief bore 17 is formed at the inner side opposite to the front end. Accordingly, the rotational torque applied to the bearing bush 6 as self-alignment force becomes larger. Similarly, the alignment force applied to the rear bearing bush 7 becomes larger, since the bearing structure in the rear end is the same as that of the front end.

Figure 2:
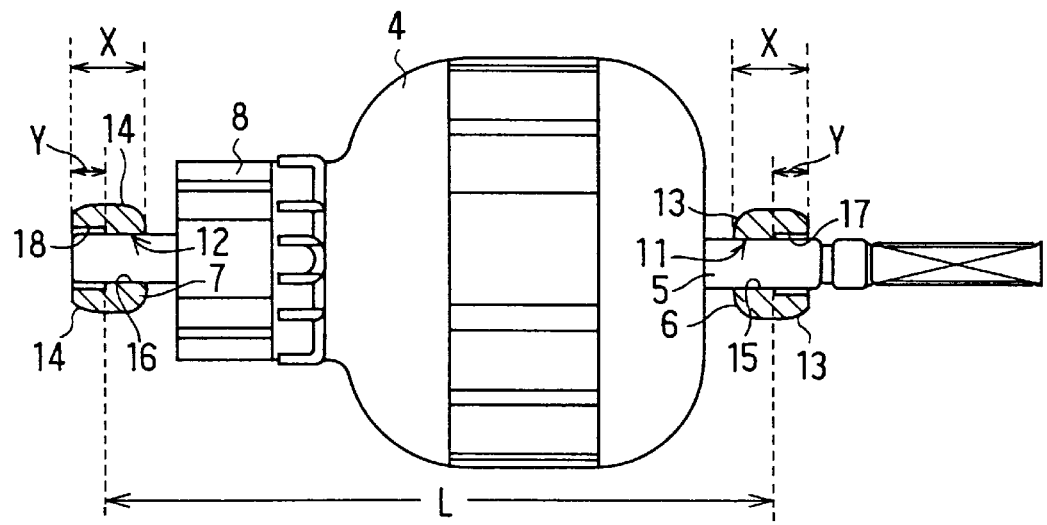
FIG. 2 is a schematic view showing a rotor and bearing bushes and a distance L between supporting positions.
Figure 3A:
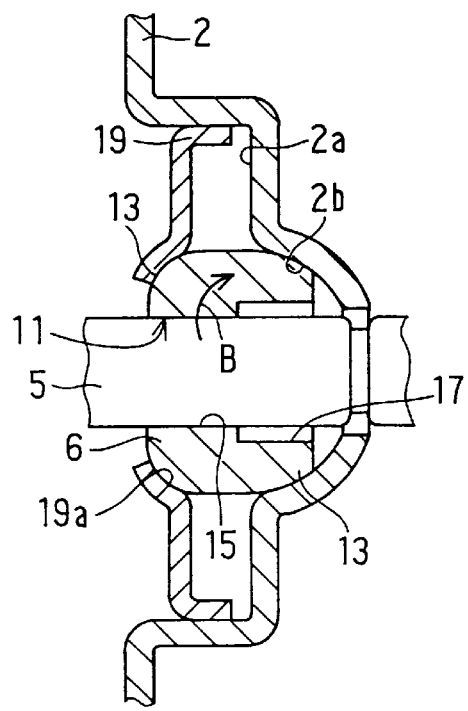
FIG. 3A is a fragmental cross-sectional view showing a front bearing structure.
Figure 3B:
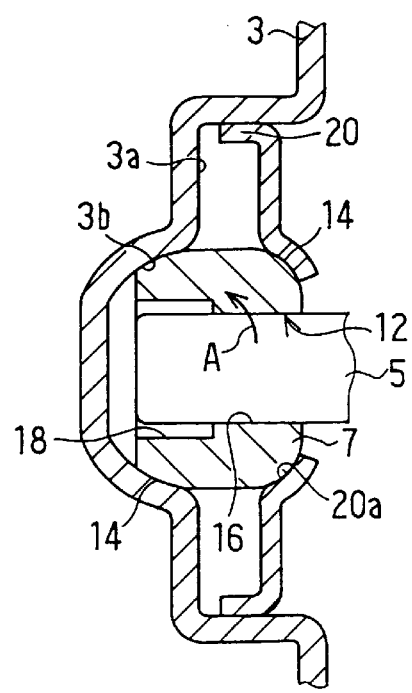
FIG. 3B is a fragmental cross-sectional view showing a rear bearing structure.

FIG. 2 shows distance L between the supporting position on the front bearing bush 6 and the supporting position on the rear bearing bush 7. The supporting position on each bearing bush varies within a length (X-Y), where X is a length of the bearing bush 6, 7, and Y is a length of the relief bore 17, 18. The distance L shown in FIG. 2 is the maximum distance, and it may be reduced by 2(X-Y). In other words, the distance between both supporting positions varies from L to [L-2(X-Y)], and its fluctuation range is 2(X-Y). If there is no relief bore provided, the fluctuation range is 2·X. Since the fluctuation range becomes smaller in the bearing structure of the present invention, a fluctuation of the natural vibration frequency of the shaft 5 also becomes smaller. Therefore, it becomes easier to avoid the natural vibration frequency in designing the motor. In addition, if the natural vibration of the shaft occurs at the distance L, for example, the distance L can be easily changed by changing the length Y. This means that the natural vibration frequency can be avoided easily without making major change in motor components. Further, since the relief bores 17, 18 are formed at the outer ends of the motor, the couple force B, A applied to the bearing bushes 6, 7 is first transmitted to the bearing retainers 19, 20, and then to the housing 2 or the rear end frame 3 (refer to FIGS. 3A and 3B). Therefore, the vibration of the shaft 5 is not directly transmitted to the housing 2.

The advantages of the bearing structure described above will be summarized as follows. (1) Since the relief bores 17, 18 are formed at both outer ends, the fluctuation of the distance between both supporting positions is small, and accordingly the natural vibration frequency of the shaft 5 can be easily avoided in designing the motor. Therefore, harmful noises otherwise generated in the motor can be reduced. (2) The natural vibration of the shaft can be easily avoided by simply changing the length of the relief bores 17, 18. (3) The shaft 5 and the bearing bushes 6, 7 are automatically aligned by the self-alignment function in the bearing structure. (4) The couple force given to the bearing bushes 6, 7 for self-alignment is large because the relief bores 17, 18 are located at outer ends. (5) The couple force is not directly applied to the housing 2, and accordingly the vibration of the shaft 5 is not directly transmitted to the housing 2. (6) The bearing bushes 6, 7 are well cooled down because open spaces are provided by the relief bores 17, 18. (7) Passages for supplying lubricant oil to the bearing bushes 6, 7 are not necessary because the oil-impregnated bearings are used. (8) Lubrication of the bearing is improved, since the surface area of the bearing surface 15, 16 is small because of the relief bore 17, 18, surface pressure is high, and accordingly a stable oil film is formed on the bearing surface.

Figure 4:
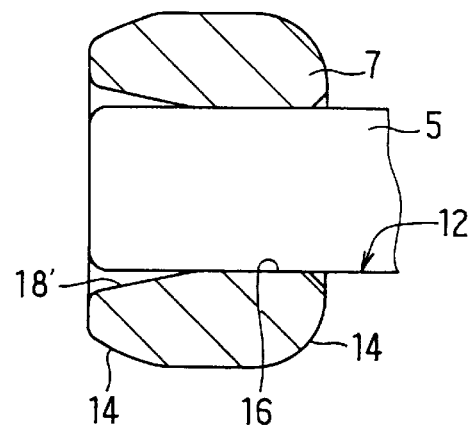
FIG. 4 is a cross-sectional view showing a modified form of a bearing bush of the present invention.
Figure 5:
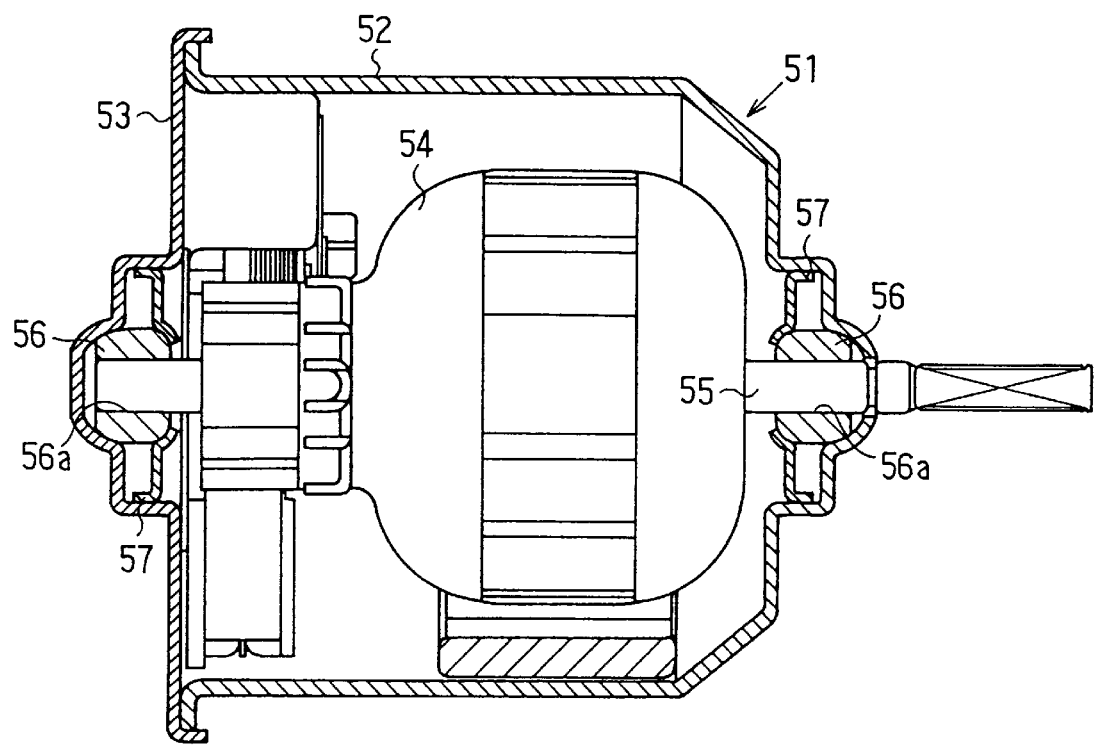
FIG. 5 is a cross-sectional view showing a conventional motor having bearing bushes at both ends of a rotor shaft.

The bearing structure described above may be modified in various ways. For example, the bearing bush 7 may be modified as shown in FIG. 4, in which the relief bore 18 is replaced by a tapered bore 18'. The tapered bore 18' is formed at the outer end of the bearing bush 7 so that its diameter gradually increases from the bearing surface 16 toward the outer end of the bearing bush 7. The front bearing bush 6 may be similarly modified. Better self-alignment may be attained in this modified form.

It is also possible to form the relief bore only on either one of the bearing bushes 6, 7. Further, the relief bore 17, 18 may be formed at both sides of the bearing surface 15, 16. In this case, the bearing bushes 6, 7 can be mounted on the housing 2 and the rear end frame 3 without considering the direction thereof. The bearing bushes 6, 7 are not limited to the oil-impregnated bearings, but other bearings may be used together with an oil supply mechanism. The bearing at either front or rear side may be replaced by a ball bearing, as long as the bearing bush having the relief bore is used at least one side.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A bearing structure of a rotating machine having a rotating shaft, for supporting the rotating shaft at its both ends, the bearing structure comprising:

a bearing bush supporting the rotating shaft at least at one end thereof, the bearing bush having rounded corners formed on an outer periphery thereof, a bearing surface on which the rotating shaft is rotatably supported and a relief bore having a diameter larger than that of the bearing surface, one end of the relief bore being connected to the bearing surface and the other end of the relief bore being open to an axial end of the bearing bush, wherein the relief bore of each bearing bush is open toward an outside of the rotating machine, so that a supporting distance is shorter than it would be if the relief bore was open to an inside of the rotating machine;

a frame member for supporting the bearing bush, the frame member having a round surface for holding the rounded corners of the bearing bush in contact therewith, wherein rotating of the shaft and the bearing surface is self-aligned by rotation of the bearing bush relative to the supporting frame member.

2. The bearing structure as in claim 1, wherein:

a pair of bearing bushes support the rotating shaft at both ends thereof.

3. A rotating machine having the bearing structure defined in claim 2.

4. The bearing structure as in claim 1, wherein:

the relief bore of the bearing bush is formed in a shape of a tapered bore, so that a diameter of the tapered bore becomes larger toward the open end thereof.

5. The bearing structure as in claim 1, wherein:

the bearing bush is an oil-impregnated bearing bush.

6. A rotating machine having the bearing structure defined in claim 1.

* * * * *